(12) United States Patent
Huang et al.

(10) Patent No.: US 11,475,595 B2
(45) Date of Patent: Oct. 18, 2022

(54) EXTRINSIC CALIBRATION OF MULTI-CAMERA SYSTEM

(71) Applicant: SONY CORPORATION, Tokyo (JP)

(72) Inventors: Sangxia Huang, Malmö (SE); Olivier Moliner, Höllviken (SE)

(73) Assignee: Sony Corporation, Tokyo (JP)

( * ) Notice: Subject to any disclaimer, the term of this patent is extended or adjusted under 35 U.S.C. 154(b) by 359 days.

(21) Appl. No.: 16/846,521

(22) Filed: Apr. 13, 2020

(65) Prior Publication Data
US 2021/0295559 A1 Sep. 23, 2021

(30) Foreign Application Priority Data

Mar. 19, 2020 (SE) .................... 2050303-3

(51) Int. Cl.
*H04N 5/247* (2006.01)
*G06T 7/80* (2017.01)
(52) U.S. Cl.
CPC ............... *G06T 7/80* (2017.01); *H04N 5/247* (2013.01); *G06T 2207/30208* (2013.01)
(58) Field of Classification Search
CPC .................................. G06T 7/80; H04N 5/247
See application file for complete search history.

(56) References Cited

U.S. PATENT DOCUMENTS

| | | | |
|---|---|---|---|
| 9,415,310 B2 * | 8/2016 | Martini | G06T 19/006 |
| 9,866,820 B1 | 1/2018 | Agrawal et al. | |
| 9,868,212 B1 * | 1/2018 | Hinterstoisser | B25J 9/1671 |
| 10,319,111 B2 * | 6/2019 | Kaji | G06T 5/006 |
| 10,623,718 B2 * | 4/2020 | Cabral | G06T 7/85 |
| 10,628,956 B2 * | 4/2020 | Ikeda | G06T 7/70 |
| 10,628,967 B2 * | 4/2020 | Briggs | G06T 5/006 |

(Continued)

FOREIGN PATENT DOCUMENTS

| | | |
|---|---|---|
| EP | 3392837 A1 | 10/2018 |
| WO | 2015192117 A1 | 12/2015 |
| WO | 2019032307 A1 | 2/2019 |

OTHER PUBLICATIONS

Shaan Gulrajani et al.: "Improved Training of Wasserstein GANs", Montreal Institute for Learning Algorithms, 2017, 11 pages.

(Continued)

*Primary Examiner* — Brian P Yenke
(74) *Attorney, Agent, or Firm* — Tucker Ellis LLP

(57) ABSTRACT

A method for extrinsic calibration of cameras in a monitoring system, performed by a calibration device, includes obtaining preliminary calibration data of the cameras, obtaining a preliminary pose for an object observed by the cameras, and determining calibration data that results in an optimization of an objective function using the preliminary calibration data and the preliminary pose as starting values for the optimization. The method further includes defining the objective function with calibration data and pose as unknown variables and including a first function yielding aggregated reprojection error, and a second function yielding pose quality based on relative orientation and relative distance between 3D points of the pose. The second function enables improved accuracy of the calibration data and may be configured to yield pose quality for individual poses or motion quality for a time sequence of poses.

20 Claims, 7 Drawing Sheets

(56) References Cited

U.S. PATENT DOCUMENTS

| | | | | |
|---|---|---|---|---|
| 10,664,998 | B2* | 5/2020 | Wakai | G06T 7/85 |
| 10,762,664 | B2* | 9/2020 | Kumar | H04N 5/2258 |
| 10,827,116 | B1* | 11/2020 | Terven | G06V 40/10 |
| 10,916,035 | B1* | 2/2021 | Kroeger | G05D 1/0212 |
| 10,950,005 | B1* | 3/2021 | Beach | H04N 5/247 |
| 11,095,870 | B1* | 8/2021 | Tahara | B64C 39/024 |
| 11,210,804 | B2* | 12/2021 | Michielin | G06T 7/246 |
| 11,270,464 | B2* | 3/2022 | Cutler | H04N 17/002 |
| 2002/0114536 | A1* | 8/2002 | Xiong | G06T 15/503 |
| | | | | 382/284 |
| 2014/0118500 | A1* | 5/2014 | Liu | H04N 13/204 |
| | | | | 348/46 |
| 2015/0119086 | A1* | 4/2015 | Mirowski | G01C 21/206 |
| | | | | 455/456.6 |
| 2017/0171525 | A1* | 6/2017 | Koehle | H04N 13/204 |
| 2018/0300590 | A1 | 10/2018 | Briggs et al. | |
| 2019/0043003 | A1 | 2/2019 | Fisher et al. | |
| 2019/0364206 | A1 | 11/2019 | Dal Mutto et al. | |
| 2020/0111234 | A1* | 4/2020 | Sun | H04N 17/002 |
| 2020/0258257 | A1* | 8/2020 | Shimoyama | G06T 7/80 |
| 2020/0273200 | A1* | 8/2020 | Ellwein | G06T 7/292 |
| 2021/0056297 | A1* | 2/2021 | Shimshoni | G06T 7/85 |
| 2021/0118180 | A1* | 4/2021 | Zamora Esquivel | G06T 7/74 |
| 2021/0166428 | A1* | 6/2021 | Kehl | G06T 7/97 |
| 2021/0183098 | A1* | 6/2021 | Huang | G06V 20/647 |
| 2021/0183101 | A1* | 6/2021 | Oryoji | G06T 7/80 |
| 2021/0264637 | A1* | 8/2021 | Huang | G06T 7/73 |
| 2021/0304435 | A1* | 9/2021 | Isberg | G06K 9/6218 |
| 2022/0067967 | A1* | 3/2022 | Luo | G06V 40/168 |
| 2022/0122289 | A1* | 4/2022 | Shang | G06T 7/80 |

OTHER PUBLICATIONS

Jens Puwein et al.: "Joint Camera Pose Estimation and 3D Human Pose Estimation in a Multi-Camera Setup", Department of Computer Science, ETH Zurich, Switzerland, Nov. 2014, 15 pages.

Ke Sun et al.: "Deep High-Resolution Representation Learning for Human Pose Estimation", University of Science and Technology of China, Feb. 25, 2019, 12 pages.

Kosuke Takahashi et al.: "Human Pose as Calibration Pattern; 3D Human Pose Estimation with Multiple Unsynchronized and Uncalibrated Cameras", NTT Media Intelligence Laboratories, Nippon Telegraph and Telephone Coorporation, Japan, Jun. 2018, 8 pages.

Tinne Tuytelaars et al.: "Local Invariant Feature Detectors: A Survey", Foundations and Trends in Computer Graphics and Vision, vol. 3, No. 3, copyright 2008, 104 pages.

Bastian Wandt et al.: "RepNet: Weakly Supervised Training of an Adversarial Reprojection Network for 3D Human Pose Estimation", Leibniz Universitat Hannover, Hannover, Germany, Jun. 2019, 10 pages.

Bin Xiao et al.: "Simple Baselines for Human Pose Estimation and Tracking", University of Electronic Science and Technology of China, 2018, 16 pages.

Michael E. Tipping et al.: "Mixtures of Probabilistic Principal Component Analysers", Neural Computation 11(2), Jun. 26, 2006, pp. 443-482.

Bastian Wandt et al.: "A Kinematic Chain Space for Monocular Motion Capture", Leibniz Universitat Hannover, Hannover, Germany, Feb. 2, 2017, 16 pages.

Office Action with Swedish Search Report from corresponding Swedish Application No. 2050303-3, dated Dec. 8, 2020, 8 pages.

Huang F. et al: "Wide-angle vision for road views", Opto-Electronics Review, Dec. 29, 2012, SP Versita, Heidelberg, dated 2013, 22 pages.

Gregorij Kurillo et al: "Wide-Area External Multi-Camera Calibration Using Vision Graphs and Virtual Calibration Object", University of California, Berkeley, IEEE 2008, 9 pages.

Wei Yang et al: "3D Human Pose Estimation in the Wild by Adversarial Learnings", Conference on Computer Vision and Pattern Recognition, IEEE 2018, 10 Pages.

* cited by examiner

EXTRINSIC CALIBRATION OF MULTI-CAMERA SYSTEM

RELATED APPLICATION DATA

This application claims the benefit of Swedish Patent Application No. 2050303-3 filed Mar. 19, 2020, the disclosure of which is incorporated herein by reference in its entirety.

TECHNICAL FIELD

The present disclosure relates generally to calibration of multi-camera systems and, in particular, to estimation of calibration data for the respective camera in such systems.

BACKGROUND ART

Recovering 3D position and/or 3D pose of objects from images has been a long-standing problem in computer vision. Techniques for 3D positioning and pose determination have a variety of applications such as 3D vision inspection, product assembly, goods inspection, human-computer interaction, video surveillance, sports broadcasting, industry robot control, navigation, etc.

One common solution is to use multiple cameras with overlapping fields of view and process individual video streams from the cameras for detection of keypoints, identify correspondence between keypoints in different views, and calculate 3D positions based on the correspondence between keypoints, and optionally temporal information. For such calculation, calibration data representing the position and orientation of the cameras needs to be known with reasonable accuracy. The determination of the calibration data is known as "extrinsic calibration" in the art. The extrinsic calibration may be performed during installation by manual measurements. This approach is time consuming, error prone, and sensitive to subsequent displacement of the cameras. In an alternative, a dedicated equipment of precise and known appearance is presented to the cameras, and the system is operated to calculate the calibration data based on detected images. This approach is also sensitive to subsequent displacement of the cameras, and the dedicated equipment must be used for re-calibration.

It has also been proposed to perform the extrinsic calibration by observing human individuals by the multiple cameras, and specifically to calculate the calibration data based on keypoints detected in the images for the human individuals. This approach allows the extrinsic calibration to be automated and re-calibration of the system to be performed by simply observing people moving around in front of the cameras. One example of this approach is found in the article "Human Pose as Calibration Pattern; 3D Human Pose Estimation with Multiple Unsynchronized and Uncalibrated Cameras" by Takahashi et al, published in 2018 IEEE/CVF Conference on Computer Vision and Pattern Recognition Workshops (CVPRW).

One general challenge of extrinsic calibration is that the detected keypoints in images may suffer from low precision, which is propagated into the calculated calibration data.

BRIEF SUMMARY

It is an objective to at least partly overcome one or more limitations of the prior art.

Another objective is to improve extrinsic calibration of a multi-camera system by use of one or more detected poses as calibration pattern.

Yet another objective is to provide for extrinsic calibration of a multi-camera system with high accuracy and/or robustness.

One or more of these objectives, as well as further objectives that may appear from the description below, are at least partly achieved by a method of calibrating cameras, a computer-readable medium, and a device configured to calibrate cameras according to the independent claims, embodiments thereof being defined by the dependent claims.

Still other objectives, as well as features, aspects and technical effects will appear from the following detailed description, from the attached claims as well as from the drawings.

BRIEF DESCRIPTION OF DRAWINGS

Embodiments will now be described in more detail with reference to the accompanying schematic drawings.

DETAILED DESCRIPTION OF EXAMPLE EMBODIMENTS

Figure 1A:
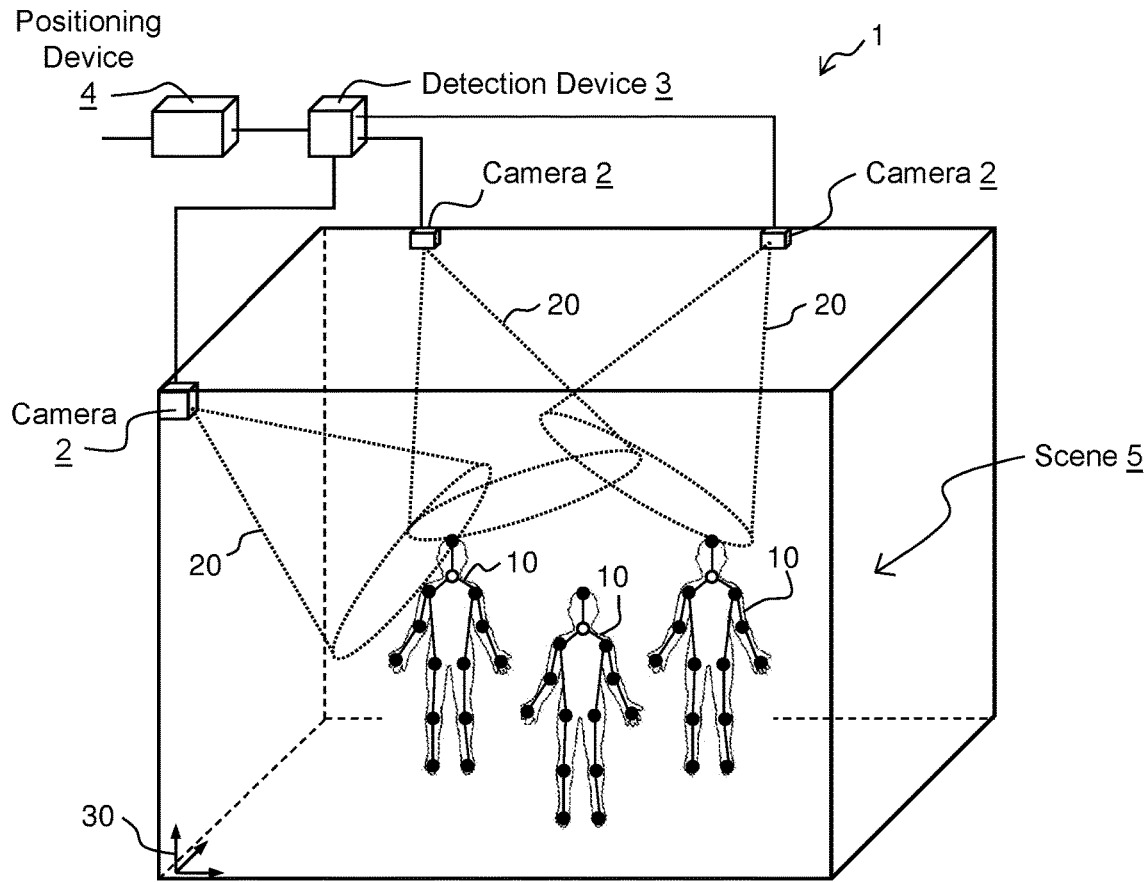
FIG. 1A is a perspective view of an example installation of a multi-camera system.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. The term "compute", and derivatives thereof, is used in its conventional meaning and may be seen to involve performing a calculation involving one or more mathematical operations to produce a result, for example by use of a computer.

As used herein, the terms "multiple", "plural" and "plurality" are intended to imply provision of two or more items, whereas the term a "set" of items is intended to imply a provision of one or more items. The term "and/or" includes any and all combinations of one or more of the associated listed items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like reference signs refer to like elements throughout.

Before describing embodiments in more detail, a few definitions will be given.

As used herein, "object" denotes any animate or inanimate object that may be represented by a set of keypoints in an image. Further, "live body" denotes the body of an animate or living object such as a human individual or an animal. Examples of inanimate objects include different types of vehicles, such as cars, bicycles, motorcycles, etc., as well as buildings, fences, furniture, interior decoration, exercise equipment, etc. The object may also comprise dedicated calibration equipment of the type mentioned in the Background section.

As used herein, "scene" denotes a three-dimensional (3D) space that is collectively monitored by two or more cameras, which have at least partly overlapping fields of views.

As used herein, "camera" is an imaging device configured to generate images of a scene by detection of electromagnetic waves and/or mechanical waves that are generated and/or reflected by the scene and objects therein. The camera may be responsive to electromagnetic waves in any wavelength range, including but not limited to ultraviolet, visible or infrared radiation, or any part or combination thereof. The camera may be configured to produce still images or a digital video stream, i.e. a coherent time sequence of images. The respective image is a two-dimensional (2D) representation of the scene, or part thereof, as seen by the camera.

As used herein, "view" or "camera view" refers to the part of the scene that is included within the field of view of a camera. The view may be embodied as an image, for example a digital image.

As used herein, "field of view" has its conventional meaning and denotes the extent of the scene that is observed by the respective camera at any given moment and may be defined as a solid angle through which the camera is sensitive to the electromagnetic/mechanical waves.

As used herein, "keypoint" has its conventional meaning in the field of computer vision and is also known as an interest point. A keypoint is a spatial location or point in an image that defines what is interesting or what stand out in the image and may be defined to be invariant to image rotation, shrinkage, translation, distortion, etc. In the present disclosure, the keypoint is also denoted "feature point" and has a predefined placement on a detected object. In the example of a live body, keypoints may identify one or more joints and/or extremities. Keypoints may be detected by use of any existing feature detection algorithm(s), for example image processing techniques that are operable to detect one or more of edges, corners, blobs, ridges, etc. in digital images. Non-limiting examples of feature detection algorithms comprise SIFT (Scale-Invariant Feature Transform), SURF (Speeded Up Robust Feature), FAST (Features from Accelerated Segment Test), SUSAN (Smallest Univalue Segment Assimilating Nucleus), Harris affine region detector, and ORB (Oriented FAST and Rotated BRIEF). Further information about conventional keypoint detectors is found in the article "Local invariant feature detectors: a survey", by Tuytelaars et al, published in Found. Trends. Comput. Graph. Vis. 3(3), 177-280 (2007). Further examples of feature detection algorithms are found in the articles "Simple Baselines for Human Pose Estimation and Tracking", by Xiao et al, published at ECCV 2018, and "Deep High-Resolution Representation Learning for Human Pose Estimation", by Sun et al, published at CVPR 2019. Correspondingly, objects may be detected in images by use of any existing object detection algorithm(s). Non-limiting examples include various machine learning-based approaches or deep learning-based approaches, such as Viola-Jones object detection framework, SIFT, HOG (Histogram of Oriented Gradients), Region Proposals (RCNN, Fast-RCNN, Faster-RCNN), SSD (Single Shot MultiBox Detector), You Only Look Once (YOLO, YOLO9000, YOLOv3), and RefineDet (Single-Shot Refinement Neural Network for Object Detection).

As used herein, "scene point" is any point in a scene that is included and detectable as a keypoint in two or more camera views. The scene point has a three-dimensional (3D) location in a common coordinate system.

As used herein, "common coordinate system" refers to a reference system that uniquely defines the 3D location of a scene point in relation to an origin.

As used herein, "calibration data" refers to one or more parameters that define the positions and orientations of the cameras monitoring the scene. The calibration data may be relative or absolute. In some embodiments, the calibration data comprises a so-called camera projection matrix ("camera matrix") for the respective camera. Such a camera matrix may or may not comprise inner ("intrinsic") parameters of the respective camera. In some embodiments, the camera matrix for a camera i is defined as $P_i = K_i [R_i T_i]$, with $K_1$ being the intrinsic matrix of the camera, $R_i$ being a rotation matrix, and $T_i$ being a translation vector. In some embodiments, the intrinsic matrix is known for the respective camera.

As used herein, "pose" refers to a collection of scene points that define the posture of an object in the scene.

Embodiments are related to extrinsic calibration of a multi-camera system based on a calibration pattern formed by one or more poses of one or more objects detected by the cameras in the system. The following description will be given for objects in the form of human individuals, but the disclosure may be applied to any type of object, be it animate or inanimate.

FIG. 1A shows an example arrangement of an example multi-camera system 1, denoted "monitoring system" in the following. The monitoring system 1 is arranged to monitor a scene 5. In the illustrated example, three individuals 10 are in the scene 5. The system 1 comprises a plurality of cameras 2 which are oriented with their respective field of view 20 towards the scene 5. The scene 5 is associated with a fixed 3D coordinate system 30, which is denoted "scene coordinate system" or "common coordinate system" herein. The cameras 2 may be fixed or moveable. When the system 1 has been calibrated, the relative positions and orientations of the cameras 2 are known for each image taken. The cameras 2 may be synchronized to capture a respective image at approximately the same time, or at least with a maximum time difference which depends on the expected maximum speed of movement of the objects 10. In one example, a maximum time difference of 0.1-0.5 seconds may provide sufficient accuracy for normal human motion. The cameras 2 are oriented with overlapping fields of view 20 and thus produce at least partly overlapping images of the scene 5.

The images captured by the respective camera 2 are received by a detection device 3, which is configured to determine one or more keypoints of one or more objects in the respective image. The detection device 3 may implement any conventional object detection technique for identifying objects of a generic or specific type in the respective image and may implement any conventional feature detection technique for identifying one or more keypoints of the respective object, for example as described hereinabove. The detection device 3 may also pre-process the incoming images, for example for noise reduction, contrast enhancement, etc. In an alternative configuration, the monitoring system 1 comprises a plurality of detection devices 3, for example one for each camera 2, where the detection devices 3 may be co-located or integrated with the cameras 2.

The detection device 3 produces object detection data (ODD), which identifies one or more keypoints of one or more objects detected in the respective image. An example of keypoints that may be detected for a human individual are indicated by open and filled dots in FIG. 1A. Thus, the respective keypoint may correspond to a joint or an extremity of the human individual. Any number of keypoints may be detected depending on implementation. For example, the ODD may represent each image (view) by a respective view identifier (V1-V3 in FIG. 1B) and a keypoint position for each keypoint detected for the respective object (K1-K3 in FIG. 1B). The detected position of the respective keypoint may be given by coordinates in a local and fixed coordinate system 32 of the respective view, as exemplified in FIG. 1B. The detection device 3 may also include a confidence score for each object and/or keypoint in the ODD, the confidence score representing a level of certainty for the respective detection of object/keypoint.

Figure 1B:
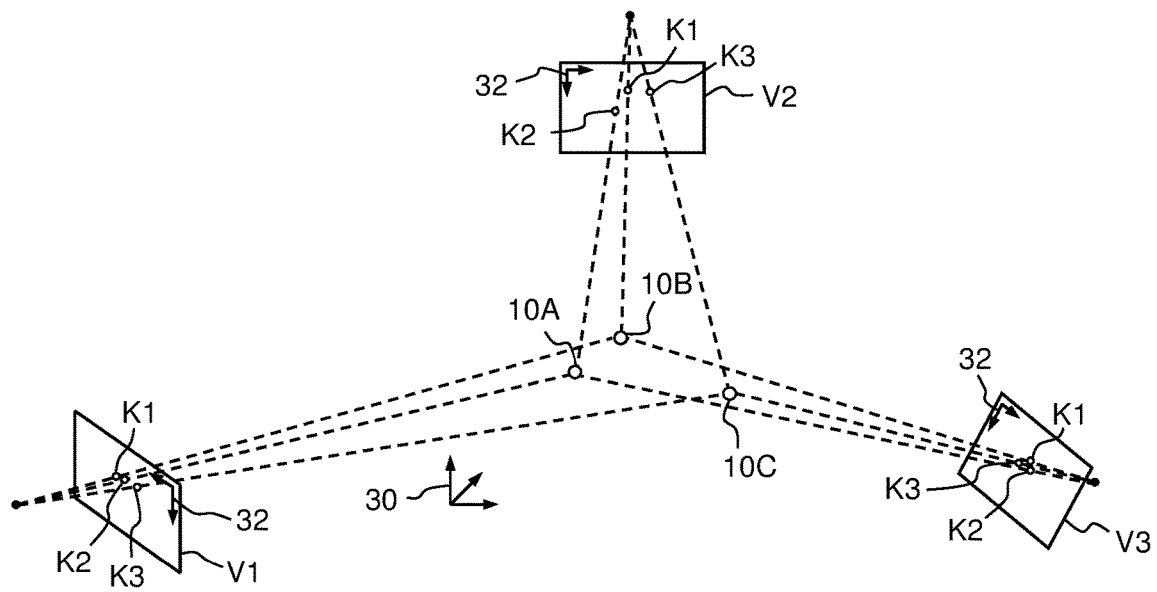
FIG. 1B illustrates scene points triangulated from feature points in three camera views.

The system 1 further comprises a positioning device 4, which is configured to operate on the ODD to compute, and possibly track over time, one or more 3D positions of the individual(s) 10 in the scene 5. The 3D positions may be given in the scene coordinate system 30 and are denoted "scene points" in the following. The scene points, when representing an object (for example, a human individual), defines a "pose" of the object. The positioning device 4 may compute the scene points by conventional triangulation. In the example of FIG. 1B, scene points 10A-10C are computed by identifying intersections of rays that extend from camera centers through the respective keypoint K1-K3 in the views V1-V3. The triangulation may be implemented to also to account for observation errors in the keypoint locations.

There are numerous available triangulation methods that may be implemented by the positioning device 4, including but not limited to so-called linear methods, optimal methods or branch-and-bound search methods. Generally, the triangulation operates on calibration data that represents the positions and orientations of the cameras 2.

Figure 1C:
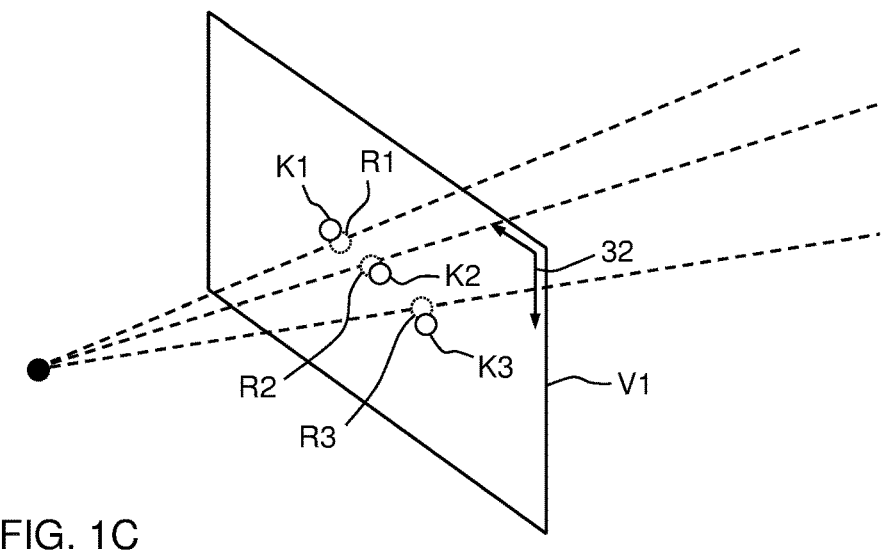
FIG. 1C illustrates a camera view with feature points and reprojections of scene points.
Figure 1D:
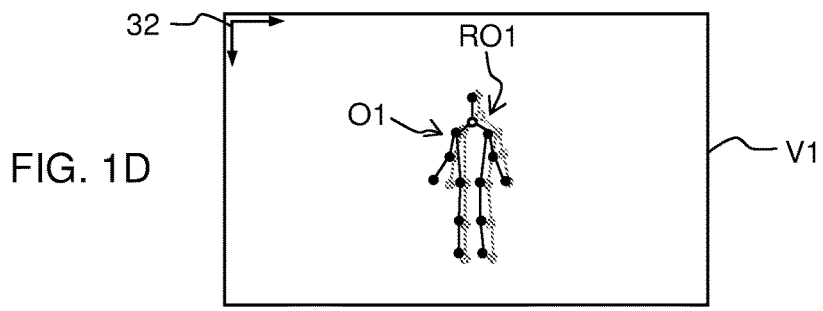
FIG. 1D illustrates a camera view with feature points and reprojected scene points for an individual.

FIG. 1C illustrates a common technique of quantifying errors in triangulation, denoted "reprojection". FIG. 1C presumes that scene points have been computed by triangulation for the keypoints K1-K3 in view V1, for example as illustrated in FIG. 1B. In the presence of observation errors, the respective scene point will be an approximation, and the calibration data for the respective camera may be used to re-project the scene point onto the respective view, resulting in a reprojection point. FIG. 1C shows examples of such reprojection points R1-R3. FIG. 1D illustrates a reprojection of scene points, calculated for object keypoints O1, onto a view V1. The reprojection results in a reprojected pose RO1. The difference between the reprojected pose RO1 and the object keypoints O1 may be quantified as a "total reprojection error", which is computed as an aggregation of distances, for example Euclidean distances, between corresponding keypoints K1-K3 and reprojection points R1-R3 (FIG. 1C). The aggregation may comprise a sum of the distances, an average of the distances, a sum of squares for the distances, a norm of the distances, etc.

Figure 2A:
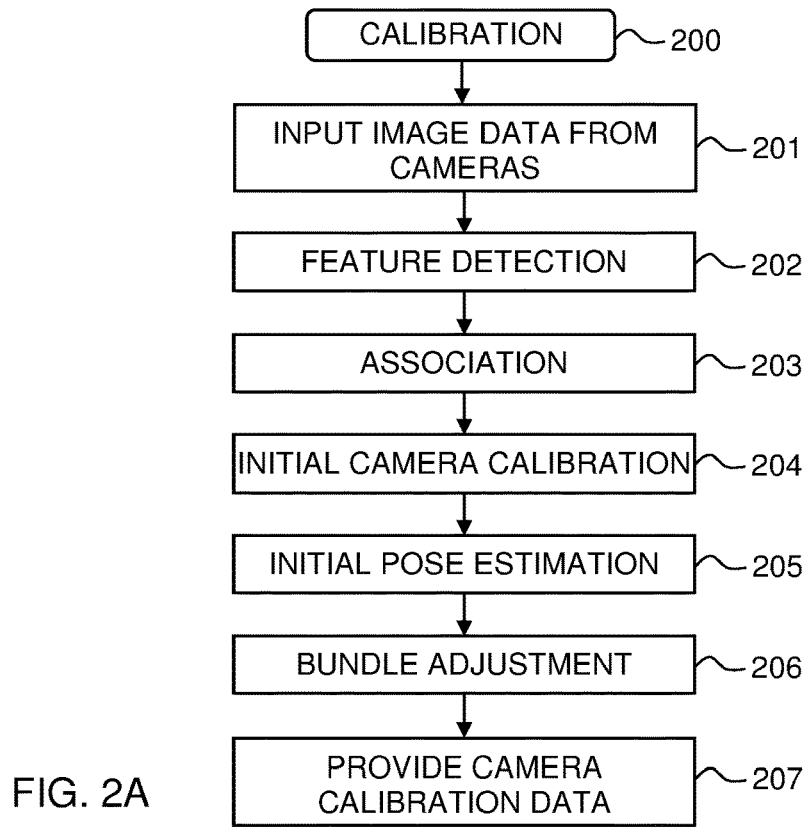
FIG. 2A is a flow chart of an example method for extrinsic calibration of cameras in a multi-camera system in accordance with an embodiment.

FIG. 2A is a flow chart of an example method 200 for calibrating the cameras in a monitoring system, for example the system 1 as shown in FIG. 1A. In the example of FIG. 1A, the method 200 may be performed jointly by the detection device 3 and the positioning device 4. Alternatively, at least part of the calibration method may be performed by a dedicated device, which may be connected to receive the ODD from the detection device 3 and/or the images from the cameras 2 and may provide the resulting calibration data to the positioning device 4. The method 200 will be described with further reference to FIG. 2B, which exemplifies the data that may be produced by the respective step in FIG. 2A.

Figure 2B:
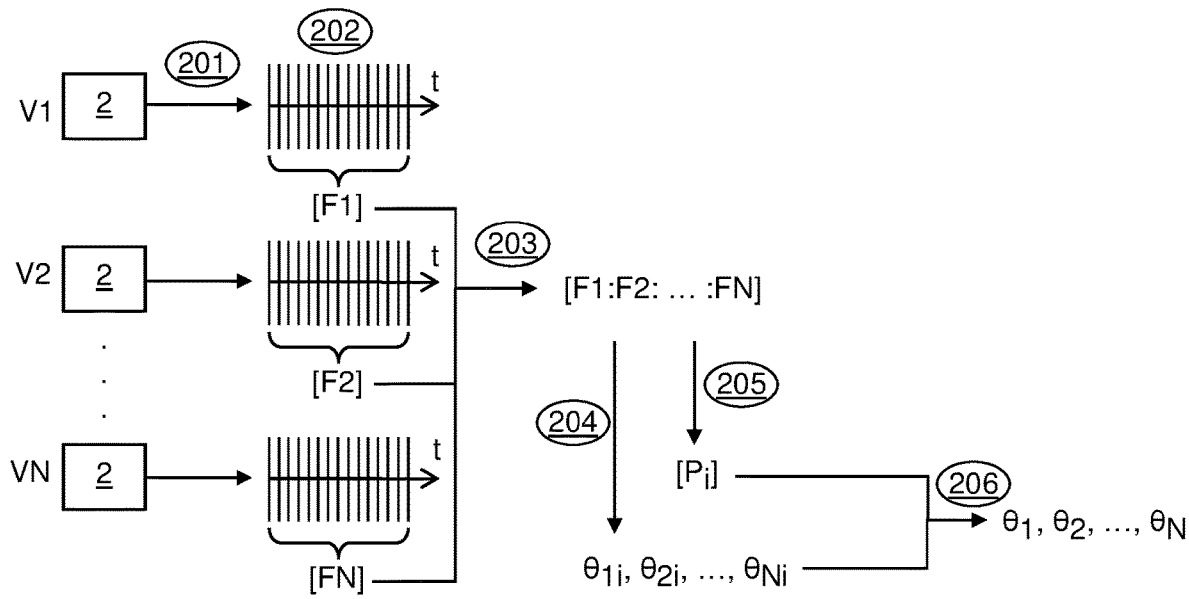
FIG. 2B illustrates an example data flow for the example method in FIG. 2A.

In step 201, image data is received from the cameras. The image data may be in form of raw image data from the respective camera, or a processed version of the raw data. The image data may comprise a single image or a time sequence of images that are generated by the respective camera during a predefined observation time window. In FIG. 2B, step 201 obtains a time sequence of images from the respective camera 2, where the images are represented by vertical lines along a time axis. The cameras 2 are arranged to define N different and at least partially overlapping views V1-VN. By jointly processing a time sequence of images, the number of available keypoints is increased significantly, which may be a technical advantage in some embodiments described herein. For example, if the cameras 2 operate at a frame rate of 50 Hz and the time sequence is captured for 20 seconds, each camera generates 1000 images for processing by the method 200. Thus, even if the number of keypoints in each image may be limited (see below), the total number of available keypoints for processing will be considerable.

In step 202, the image data is processed for feature detection, resulting in the above-mentioned keypoints and keypoint locations. Step 202 may apply any conventional object detection technique and/or feature detection technique, for example as described hereinabove. In one example, step 202 may operate a human pose estimation algorithm on the image data. Such algorithms are configured to detect people in an image or a time sequence of images, and output the location of joints and extremities of the detected people. It may be noted that it is not necessary to use all available keypoints for calibration. For example, keypoints that are expected to have larger observation errors may be excluded. For a human individual, keypoints representing ears, feet, hands, etc. may be excluded. In FIG. 2B, step 202 results in a set of keypoints for the respective time sequence of images, designated by [F1], [F2], ..., [FN]. In these sets, the keypoints may be assigned an object and a time point.

In step 203, the keypoints are associated or matched between the images (views), and optionally across time if time sequences of images are being processed. There are numerous available techniques for association/matching that may be applied by step 203, including but not limited to histograms, SIFT descriptors, appearance models, spatial-temporal continuity, etc. Step 203 results in associations of keypoints between images and optionally over time. In FIG. 2B, these associations are collectively designated by [F1:F2: ... :FN]. If time sequences of images are processed, step 203 may be seen to produce a trajectory for each keypoint, given by pairs of keypoint location and time point. To improve the quality of such trajectories, step 203 may comprise a sub-step of operating a smoothing function on the respective trajectory. The smoothing function may comprise interpolation and/or low-pass filtering. Such a smoothing results in an updated set of associated keypoints, which may be used as input by one or more of the following steps, including one or more of steps 204-206.

In step 204, the associated keypoints are processed for calculation of preliminary calibration data for the cameras 2. There are existing techniques for calculating the preliminary calibration data, for example so-called Structure from Motion (SfM) algorithms. Embodiments of an improved technique will be described further below with reference to FIGS. 4A-4B. In FIG. 2B, the preliminary calibration data for the different cameras 2 is designated by $\theta 1i, \theta 2i, \ldots, \theta Ni$.

In step 205, the associated keypoints are processed for calculation of a preliminary pose for the respective object in the scene 5 at one or more time points (cf. individuals 10 in FIG. 1A), where each preliminary pose is given by a respective set of scene points (cf. 10A-10C in FIG. 1B). In some embodiments, the preliminary pose is calculated by triangulation of a subset of the associated keypoints, and by use of the preliminary calibration data. If step 204 calculates the preliminary calibration data based on a first subset of associated keypoints, it may be advantageous for step 205 to calculate the preliminary pose(s) based on a second subset of associated keypoints, with at least part of the associated keypoints differing between the first and second subsets. The use of such first and second subsets increases the need for keypoints. The number of available keypoints may be increased by jointly processing plural images within an observation time window, as described hereinabove. Step 205 results in a set of preliminary poses, one for each object and each time point. In the example of FIG. 2B, the set of preliminary poses is designated by [Pi]. In some embodiments, the respective pose may be represented by a pose vector of scene point locations.

In step 206, a so-called bundle adjustment is performed for the associated keypoints using the preliminary calibration data and the set of preliminary poses as input. In this context, the bundle adjustment produces refined calibration data for the cameras 2. In the example of FIG. 2B, the refined (or final) calibration data for the different cameras 2 is designated by $\theta 1, \theta 2, \ldots, \theta N$.

The bundle adjustment is a well-known technique of simultaneously refining scene points and calibration data in view of an optimization criterion. Conventionally, bundle adjustment involves minimizing an objective function that defines the above-mentioned total reprojection error. In such an objective function, the scene points and the calibration data are the unknown variables of the objective function. In bundle adjustment, the objective function may be optimized in an iterative fashion, with initial values ("starting values") for the calibration data and the pose being given by the preliminary calibration data and the preliminary pose. However, conventional bundle adjustment is inherently sensitive to the above-mentioned observation errors. Embodiments of an improved technique will be described further below with reference to FIGS. 3A-3F.

In step 207, the method 200 provides final camera calibration data, which is the refined calibration data produced by step 206, or a post-processed version thereof. In some embodiments, depending on the common coordinate system, the post-processing may be applied to convert the refined calibration data into a coordinate system with a coordinate axis perpendicular to the ground, for example by rotating the common coordinate system. In some embodiments, post-processing may be applied to estimate the scaling of the monitoring system, for example by detecting images of an object of known length, measuring the time it takes for an object travelling at known speed or acceleration between locations (for example, estimate initial height by measuring time it takes for an object to free fall to the ground), or manipulating images to position keypoints at known locations. The camera calibration data provided by step 207 may be used by the processing device 4 to compute the scene points when the system 1 is operated for monitoring the scene 5.

It is understood that the method 200 may be repeated to update the calibration data ("re-calibration"), for example to account for intentional or unintentional changes in the position and/or orientation of one or more of the cameras 2. Such re-calibration may be triggered based on image analysis. For example, in the example with human individuals, the positioning device 4 may analyze the distribution of the length of the limbs of individuals over time, to detect a need for re-calibration. If the monitoring system 1 is well calibrated, the distribution should have a small standard deviation. Thus, in one example, re-calibration may be trigged when the standard deviation for limb length exceeds a predefined threshold.

Figure 3A:
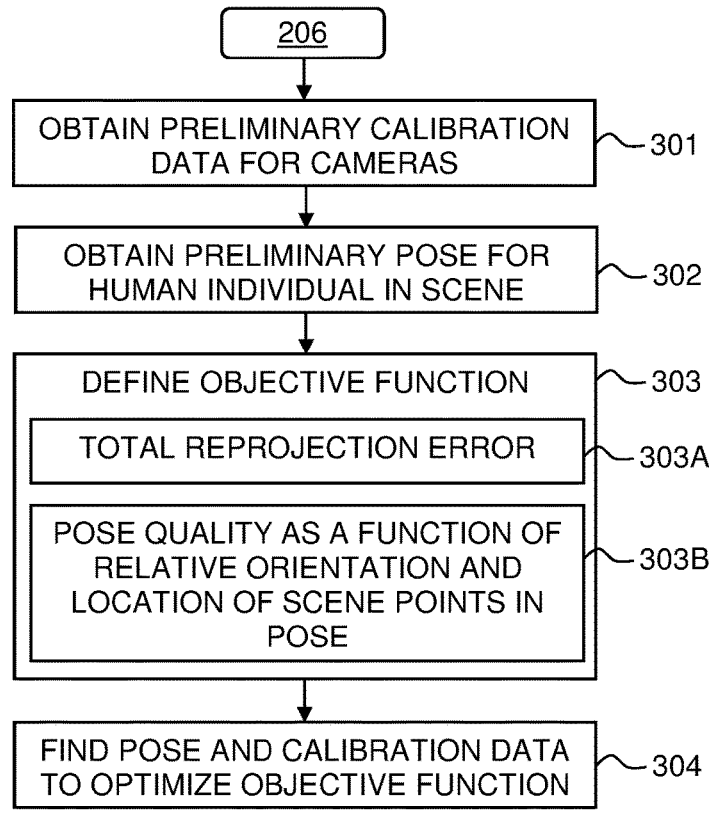
FIGS. 3A-3D are flow charts of example methods for bundle adjustment in accordance with embodiments.

FIG. 3A is a flow chart of an example procedure for calculating the final calibration data in accordance with some embodiments. As indicated, the example procedure may be implemented as part of step 206 in FIG. 2A. Step 301 obtains preliminary calibration data for the cameras 2 in the system 1. The preliminary calibration data may have been calculated by step 204, or otherwise estimated, for example based on the most recent final calibration data. Step 302 obtains a preliminary pose for at least one individual located in the scene and at least one time point. The preliminary pose may have been calculated by step 205. The subsequent processing in steps 303-304 will only operate on the keypoints that correspond to the preliminary pose. To increase the number of keypoints, step 302 may thus obtain preliminary poses for more than one individual (if present) and more than one time point. In some embodiments, step 302 may obtain a single preliminary pose and the subsequent processing may operate to determine the calibration data based on the single preliminary pose, for example by use of the total reprojection error and the pose error function (below). However, it is to be understood that step 302 may obtain a plurality of preliminary poses, for example for different objects in the scene (cf. individuals 10 in FIG. 1A) and/or for different time points during the above-mentioned observation time window. The subsequent processing may operate to determine the calibration data based on the plurality of preliminary poses, not only by use of any of the total reprojection error, the pose error function, and the motion error function (below).

Step 303 defines the objective function E to be optimized by step 304. Defining the objective function comprises at least defining 303A a first function and defining 303B a second function. The first function, designated $E_R$ herein, represents the total reprojection error and may be defined as described with reference to FIG. 1C. In some embodiments, $E_R$ is defined using, as input data ("known values"), the keypoint locations of the keypoints that correspond to the preliminary pose(s) obtained by step 302, or a subset thereof, and is further defined using, as unknown variables ("latent variables"), the calibration data and the pose(s).

In some embodiments, the first function $E_R$ is configured to operate a Huber loss function on the distances between corresponding keypoints and reprojection points to compute difference values that are then aggregated to define the total reprojection error. By definition, the Huber loss function is quadratic for small distances and linear for large distances and thereby reduces the influence of outliers among the distances. Such outliers may be the result of the above-mentioned observation errors.

In some embodiments, the aggregation of distances in the first function $E_R$ comprises a weighted sum of difference values, where each difference value represents the reprojection error for a keypoint and its corresponding scene point. The weighted sum comprises a weight for the respective difference value: $\Sigma_j(w_j \cdot \Delta D_j)$, with j designating the respective pair of keypoint and scene point. As understood from the foregoing, the difference value, $\Delta D_1$, may be a distance (for example Euclidean), the absolute value of the distance, the square of the distance, an output value of the Huber loss function for the distance, etc. It has been surprisingly found that the distribution of reprojection errors varies in dependence of the distance from the camera to the scene points ("scene point distance"). Specifically, there is an overall trend that scene points further away from the camera have a smaller reprojection error on the camera. In some embodiments, the weight $w_j$ for the respective difference value $\Delta D_1$ is computed as a function of its corresponding scene point distance. For example, the weight may be increased with increasing scene point distance to improve robustness to outliers and thereby improve the accuracy of the total reprojection error in the first function $E_R$. In some embodiments, the weight is computed as a linear function of the scene point distance. In one non-limiting example, the weight is given by: $w_j = \text{clip}(a_d + b_d \cdot d_j, 0, u_d)$, in which $d_j$ is the scene point distance, and $a_d$, $b_d$, $u_d$ are parameters that may be predefined. Here, a clip function is used to limit the weight to the interval $[0, u_d]$. It has also surprisingly been found that the distribution of reprojection errors varies in dependence of the above-mentioned confidence score. Specifically, there is an overall trend that keypoints with higher confidence score have a smaller reprojection error on the camera. In some embodiments, the weight $w_1$ for a difference value $\Delta D_1$ is computed as a function of its corresponding confidence score. For example, the weight may be increased with increasing confidence score to thereby improve robustness to outliers. In some embodiments, the weight is computed as a linear function of the confidence score. In one non-limiting example, the weight is given by: $w_j = \text{clip}(a_s + b_s \cdot s_j, 0, 1)$, in which $s_j$ is the confidence score, and $a_s$, $b_s$ are parameters that may be predefined. Here, a clip function is used to limit the weight to the interval [0,1]. In some embodiments, the weight may be computed as a function of both the scene point distance and the confidence score, for example by: $w_1 = \text{clip}(a_d + b_d \cdot d_j, 0, u_d) + \text{clip}(a_s + b_s \cdot s_j, 0, 1)$.

The second function, defined by step 303B and designated $E_Q$ herein, is a "pose quality function" that determines the quality of the pose(s) with respect to the relative orientation and relative distance between scene points in the respective pose. In some embodiments, $E_Q$ is defined to use the pose(s), i.e. groups of scene points, as unknown variable. One general advantage of including $E_Q$ in the objective function is that it relaxes the impact of the reprojection errors, and thereby the impact of observation errors, on the optimization. The second function, $E_Q$, is defined to attain high values for poses deemed to be of low quality and low values for poses deemed to be of high quality. The "quality" of a pose refers to the likelihood that the pose is an actual pose that has been attained by the corresponding object in the scene. In the example that the object is a human individual, the second function is thus defined to indicate the likelihood that the pose is a human pose. By accounting for both relative orientation and relative distance between scene points, the second function will have a high ability to assign a proper quality value to each pose. In some embodiments, the second function is configured to determine the quality of the pose as a function of a difference between the pose and one or more valid object poses. Such a second function is also denoted "pose error function" herein and is designated $E_{QP}$. Optimization of an objective function comprising $E_{QP}$ will encourage the pose to correspond to a plausible pose of the object in the scene. In some embodiments, the second function is configured to determine the quality of the pose based on a comparison between a time sequence of poses, which includes the pose, and a valid object motion. Such a second function is also denoted "motion error function" herein and is designated $E_{QM}$. Optimization of an objective function comprising $E_{QM}$ will encourage the pose, as included in the time sequence of poses, to correspond to a plausible object motion in the scene.

In some embodiments, the objective function E is a weighted combination of the first and second functions: $E = w_R \cdot E_R + w_Q \cdot E_Q$, with $w_R$ and $w_Q$ being weights. In some embodiments, $E_Q$ is one of the pose error function $E_{QP}$ and the motion error function $E_{QM}$. In some embodiments, the second function is a weighted combination of the pose error function $E_{QP}$ and the motion error function $E_{QM}$: $E_Q = w_{QP} \cdot E_{QP} + w_{QM} \cdot E_{QM}$.

It may be noted that the objective function E may include further error functions. In one example, the objective function E comprises a smooth motion error function $E_{SM}$, which is configured to penalize non-uniform acceleration of keypoints between consecutive time points and to encourage the scene points to represent smooth motion. One example of $E_{SM}$ is described in the above-mentioned article by Takahashi et al, in which the error function comprises third-order differential values for scene point trajectories. By analogy with the above-mentioned keypoint trajectories (step 203), a "scene point trajectory" is a time-sequence of scene points that have been associated across time to represent movement of a specific part of the object in the scene. For objects with complex motion patterns, it may be beneficial to penalize higher-order movement to encourage smooth motion while still allowing for abrupt changes. For example, in human motion, joints may exhibit frequent changes in velocity and acceleration. In some embodiments, $E_{SM}$ may comprise fourth-order differential values for scene point trajectories, for example the l2-norm thereof. In some embodiments, $E_{SM}$ may be normalized by a size parameter for the respective pose, to make $E_{SM}$ independent of scale. In a further example, the objective function E may comprise a length error function $E_L$, which is configured to encourage the reconstructed lengths between pairs of scene points to stay constant over time. For example, for human objects, pairs of scene points at each time point may represent limbs, and the length of such limbs should be substantially constant over time. In some embodiments, $E_L$ is configured to operate on the distance between such pairs of scene points as a function of time to generate a measure of the temporal consistency of the distances between the scene points. In one embodiment, $E_L$ may compute a coefficient of variation for distances of the respective scene point pair over time and generate the temporal consistency measure by aggregating the coefficients of variation for the different pairs. Here, the coefficient of variation denotes the ratio between the standard deviation of distances and the mean of distances.

It may also be noted that the first function and/or the second function may include one or more further unknown variables, such as object type, activity type, etc.

In step 304, the objective function E defined in step 303 is subjected to an optimization procedure, for example iterative, to find values of the unknown variables that optimize the objective function E. In the example that the objective function comprises error functions, the optimization may aim at minimizing the objective function. Any suitable optimization algorithm may be used in step 304, for example a gradient-based algorithm, a direct search method, a Newton-based algorithm, etc.

Figure 3B:
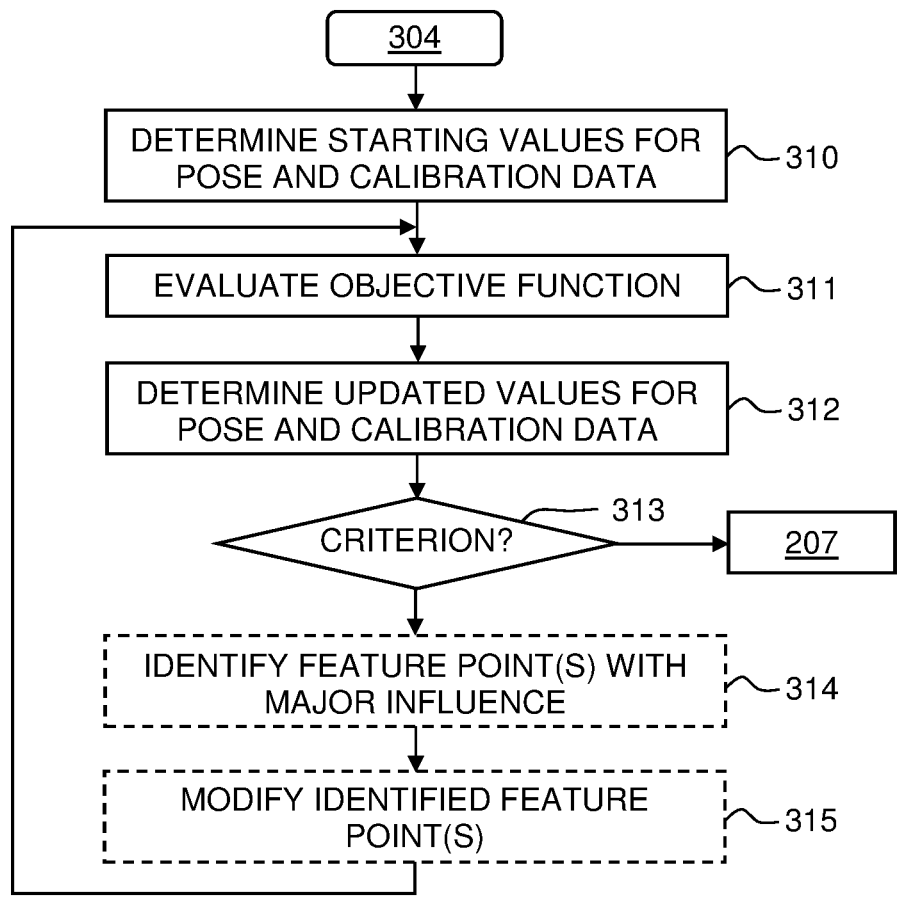

FIG. 3B is a flow chart of an example procedure for iteratively optimizing the objective function in accordance with some embodiments. As indicated, the example procedure may be implemented as part of step 304 in FIG. 3A.

In step 310, the starting values for pose and calibration data are determined based on the preliminary pose and the preliminary calibration data. In some embodiments, to reduce ambiguity and complexity caused by pose rotation and scaling, for example in steps 321 and 322 (FIG. 3C and below), the starting values for the pose may be determined by aligning the preliminary pose to a reference pose, for example by Procrustes alignment. Thereby, the scene points of the preliminary pose are adjusted in the scene coordinate system 30. In one example, the preliminary pose may be aligned to be upright and face in a predefined direction. In another example, reference locations are defined for a subset of the scene points, and the preliminary pose is transformed so that the subset of scene points are in the reference positions. In some embodiments, to reduce ambiguity caused by object size variation, the (aligned) preliminary pose is normalized, for example by division with its standard deviation.

In some embodiments, for example for human objects, step 310 may comprise projecting the respective preliminary pose, given in the scene coordinate system 30 (FIG. 1), onto a kinematic chain space (KCS) to generate the starting values for the pose. The projection of the preliminary pose results in a KCS matrix, which has limb lengths on its diagonal and an angular representation on the other entries. The limb length corresponds to a distance between pairs of scene points in the pose. In some embodiments, the KCS matrix is computed as: $M_{KCS}=M \cdot M^T$ or as its normalized version: $\overline{M_{KCS}}=\text{diag}(M_{KCS})^{-1} \, M_{KCS} \cdot \text{diag}(M_{KCS})^{-1}$, where the function diag operates on a matrix to generate a vector that contains the diagonal elements of the matrix. Here, M is a matrix containing one vector for a respective limb in the pose, the vector being defined by the pair of scene points that corresponds to the limb in the pose. Thus, $M \in \mathbb{R}^{L \times 3}$ if the number of limbs is L, and $\overline{M_{KCS}}$ may be regarded as a vector of size $L^2$. By generating the KCS matrix, the above-described pose alignment and normalization may be omitted since the KCS matrix contains a representation of the angles between the limbs and is unaffected by rotation or scaling. Details of KCS projection are for example described in the articles "RepNet: Weakly Supervised Training of an Adversarial Reprojection Network for 3D Human Pose Estimation", by Wandt and Rosenhahn, arXiv:1902.09868 [cs.CV], 2019, and "A Kinematic Chain Space for Monocular Motion Capture", by Wandt et al, arXiv:1702.00186v1 [cs.CV], 2017.

Following step 310, the optimization procedure iterates through steps 311-315 until an end criterion is fulfilled, as detected by step 313, whereupon the current calibration data is provided in the monitoring system (step 207 in FIG. 2A). The end criterion may, for example, be given by a predefined number of iterations or a convergence criterion. During each iteration, step 311 evaluates the objective function, based on the current values for the pose and the calibration data, and step 312 determines updated values for the pose and the calibration data in relation to an optimization criterion. The skilled person understands that the updating step 312 is specific to each type of optimization algorithm. In some embodiments, one or more of the iterations comprises steps 314-315. Step 314 identifies a set of keypoints that has a major influence on the objective function, and step 315 modifies the set of keypoints to reduce its influence. In some embodiments, step 314 first determines the one or more scene points with the largest contribution to the objective function, and then includes the corresponding keypoints in the set of keypoints. Step 314 may be performed algorithmically or by brute force testing. Step 315 may remove the set of keypoints and the corresponding scene point(s) from the objective function, or apply a weight factor to reduce their impact on the objective function. The rationale for steps 314-315 is that the set of keypoints is likely to be erroneous, and removing it may improve calibration accuracy. In some embodiments, steps 314-315 are performed, for example periodically, towards the end of the optimization procedure.

Figure 3C:
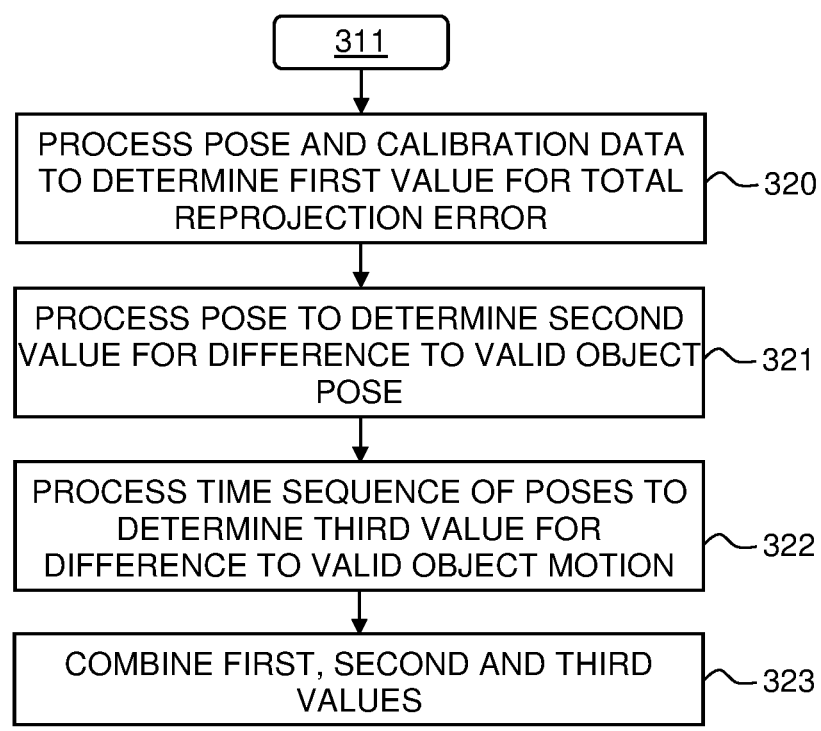

FIG. 3C is a flow chart of an example procedure for evaluating the objective function in accordance with some embodiments. As indicated, the example procedure may be implemented as part of step 311 in FIG. 3B.

In step 320, the current pose and calibration data are processed to determine a first value for the total reprojection error, $E_R$.

In step 321, the current pose is processed to determine a second value (pose quality) for the pose error function, $E_{QP}$. In some embodiments, step 321 determines the second value by use of a trained model which is configured to determine the quality of the respective current pose in relation to an ensemble of valid object poses. For example, the trained model may comprise one or more of a neural network, an autoencoder, a PCA analysis function, a Gaussian Mixture Model function, a Normalizing flows function, or any equivalent function.

In some embodiments, the trained model comprises a discriminator of a Generative Adverserial Network (GAN). FIG. 3E is a block diagram of an example GAN 340, which comprises two neural networks with competing objectives:

a discriminator network ("discriminator") 345 which is arranged to determine whether a pose is valid or invalid, and a generator network ("generator") 342 which is arranged to generate poses that the discriminator 345 will classify as valid. An updating module is arranged to update the generator 342 and/or the discriminator 345 based on the output of the discriminator 345. Training of the GAN 340 provides the discriminator 345 the ability to detect invalid poses and the generator 342 the ability to produce poses that match the distribution of the training data. During training, the generator 342 is fed random noise 341 and outputs poses 343, i.e. groups of scene points in the scene coordinate system. The discriminator 345 is alternatingly provided with the poses 343 from the generator 342 and valid object poses 344. The valid object poses 344 may, for example, be actual poses of objects recorded with an accurate high-speed motion capture system. It may also be beneficial to perturb the valid object poses 344 by a small amount of random noise. In one non-limiting example, the GAN 340 may be trained in accordance with the article "Improved Training of Wasserstein GANs", by Gulrajani et al, arXiv:1704.00028 [cs.LG], 2017. The valid object poses 344 may be realigned and/or normalized, or projected into KCS, as described with reference to step 310. When trained, the discriminator 345 is operable to output a score that represents the likelihood that a pose is an invalid object pose, i.e. a low score for valid poses and a high score for invalid poses. The above-mentioned second value may thus be determined by feeding the respective current pose to the trained discriminator 345, where the second value is given as a function of the resulting score.

In a non-limiting example, the generator 342 may be built from multiple residual blocks of fully connected (FC) layers. The discriminator 345 may comprise one path for feeding poses into a kinematic chain space (KCS) layer, for example as described in the above-mentioned article by Wandt and Rosenhahn. The discriminator 345 may further comprise another path built from multiple FC layers. The feature vectors of both paths may be concatenated and fed into another FC layer which outputs the score.

In some embodiments, the trained model used by step 321 is a PCA model which has been trained by fitting it to an ensemble of valid object poses, for example actual poses of objects recorded with an accurate high-speed motion capture system. To improve robustness of the fitted model, data augmentation may be performed during training by also fitting the PCA model to one or more copies of the ensemble in which noise, for example Gaussian noise, has been applied to the joint locations (scene points) of the valid object poses. Once the PCA model is fitted, a likelihood or probability value of each pose may be calculated by use of the PCA model. The second value (pose quality) for the pose error function $E_{QP}$ may then be given by the average likelihood of all poses. The calculation of a probability value by use of a fitted PCA model is known in the art and may, for example, be performed based on the teachings in the article "Mixtures of Probabilistic Principal Component Analysers", by Tipping and Bishop, Neural Computation 11(2), pp 443-482, 1999.

Reverting to FIG. 3C, step 322 processes a time sequence of poses that includes the current pose to determine a third value (motion quality) for the motion error function, $E_{QM}$, and step 323 combines the first, second and third values into a current value of the objective function. The current value may then be processed by step 312 in FIG. 3B.

It should be noted, as explained further above, that steps 320 and 321 may process a plurality of current poses in each iteration of the optimization procedure. In such embodiments, the first value may be given by an aggregation of the total projection error for each of the current poses, and the second value may be given by an aggregation of the pose quality for each of the current poses.

Figure 3D:
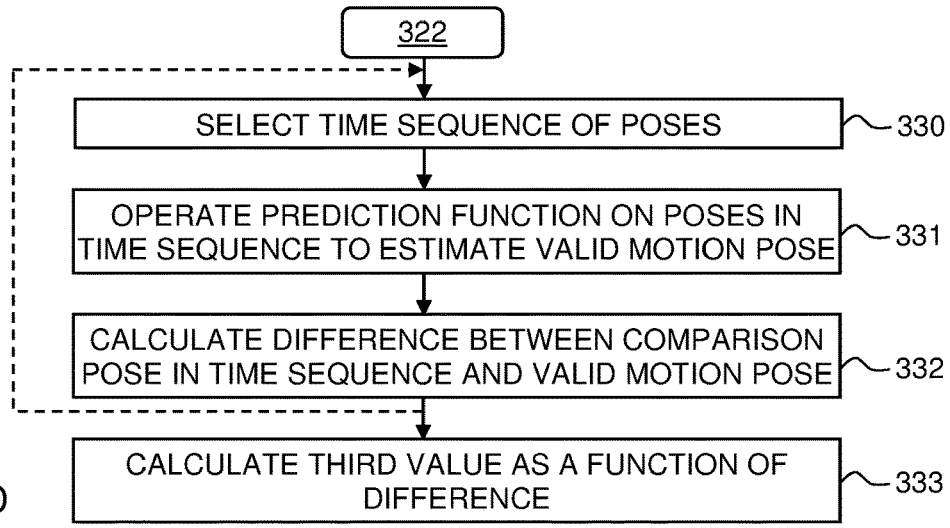
Figure 3E:
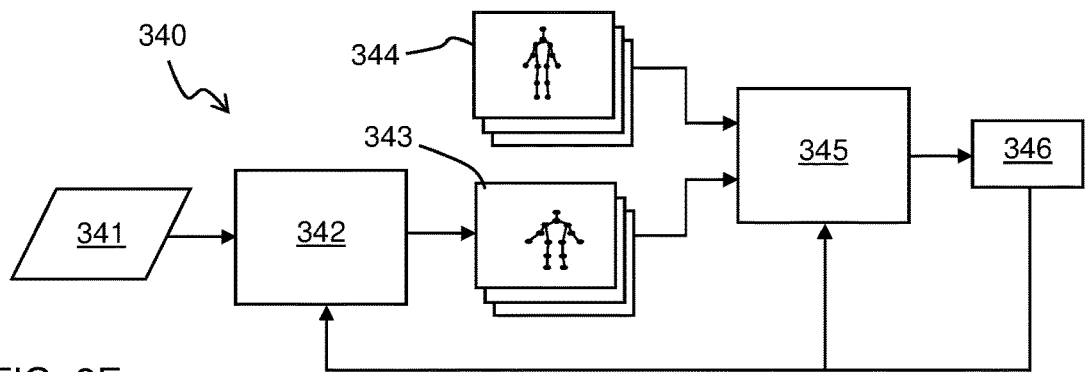
FIGS. 3E-3F are block diagrams of an example GAN and an example motion analyzer, respectively, for use in the example methods of FIGS. 3A-3D.

FIG. 3D is a flow chart of an example procedure for determining the third value for the motion error function in accordance with some embodiments. As indicated, the example procedure may be implemented as part of step 322 in FIG. 3C.

Figure 3F:
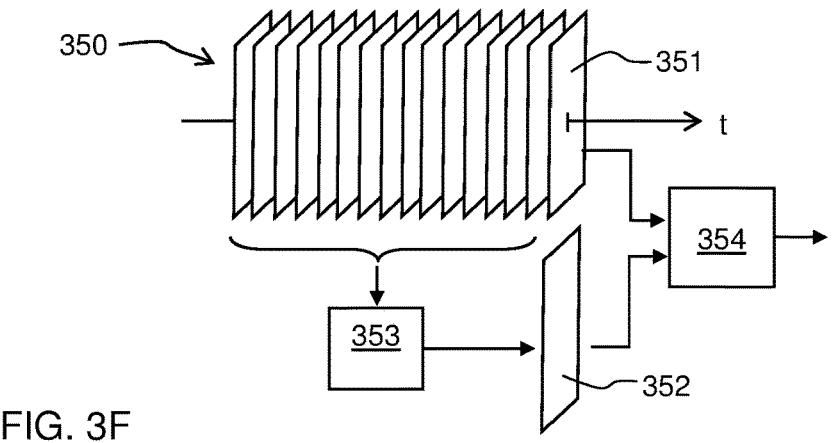

In step 330, a time sequence of poses is selected. The selected time sequence of poses may correspond to a sequence of time points within the above-mentioned observation time window. FIG. 3F shows an example of such a selected sequence 350, where each vertical panel represents a pose and a time point.

In step 331, a prediction function is operated on poses in the time sequence to estimate a valid motion pose at one or more selected time points.

In step 332, a difference is calculated between one or more pairs of valid motion pose and comparison pose. The comparison pose is included in the selected sequence and associated with the same selected time point as the valid motion pose in the respective pair. The difference may, for example, be calculated by aggregation of Euclidean distances between corresponding scene points in the respective pair of valid motion pose and the comparison pose.

In step 333, the third value is calculated as a function of the difference.

An example of the procedure in FIG. 3D is illustrated in FIG. 3F. Here, the prediction function 353 is operated on all poses in the selected sequence 350 except one comparison pose 351 to estimate a valid motion pose 352 at the time point of the comparison pose 351, and a comparison module 354 is operated to compute the difference between the valid motion pose 352 and the comparison pose 351. It may be noted that the comparison pose(s) 351 need not be subsequent to the selected sequence 350, as shown in FIG. 3F, but may be located at any time point within the selected sequence.

As indicated by a dashed arrow in FIG. 3D, steps 330-332 may be repeated any number of times to calculate further differences. The repetitions may differ by selected time sequence and/or by time point(s) of the comparison pose(s). If steps 330-332 are repeated, step 333 may aggregate the differences produced by the repetitions to improve the accuracy of the third value.

The prediction function 353 may comprise a trained model like the trained model used in step 321 and may, for example, comprise one or more of a neural network, an autoencoder, a PCA analysis function, a Gaussian Mixture Model function, a Normalizing flows function, or any equivalent function. The prediction function 353 may be trained based on sequences of poses representing valid motion of poses. For example, the GAN 340 in FIG. 3E may be trained by the discriminator 345 receiving time sequences of poses 343 from the generator 342 as well as valid sequences of poses 344. The generator 342 and the discriminator 345 may be configured as described above. In another non-limiting example, the multiple residual blocks of the discriminator 345 may be first applied to individual poses in a time sequence to extract features for individual poses, whereupon residual blocks of convolutions may be applied to the extracted feature for temporal aggregation.

Figure 4A:
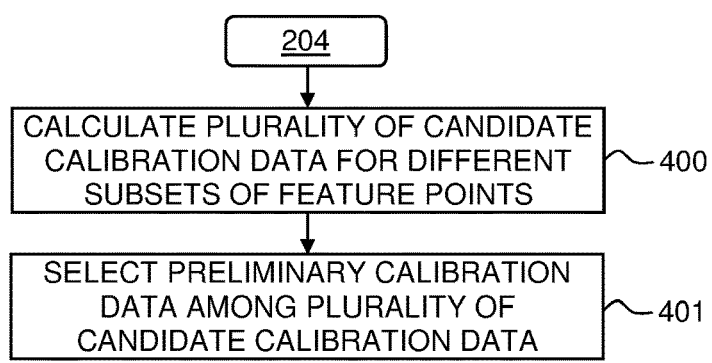
FIGS. 4A-4B are flow charts of example methods for initial calibration of cameras in accordance with embodiments.

FIG. 4A is a flow chart of an example procedure for calculating the preliminary calibration data in accordance with some embodiments. As indicated, the example procedure may be implemented as part of step 204 in FIG. 2A. In step 400, a plurality of candidate calibration data is calculated for a plurality of different subsets of the associated keypoints generated by step 203. In step 401, the preliminary calibration data is determined as a function of the plurality of candidate calibration data. By determining a plurality of calibration data for different subsets of associated keypoints, the accuracy and robustness of the preliminary calibration data may be improved since the impact of any single subset of associated keypoints is reduced. By processing different subsets of associated keypoints, the computational load may also be reduced compared to calculating the preliminary calibration data for all available associated keypoints. It is realized that steps 400-401 will greatly benefit from the increase in available keypoints that is achieved by jointly processing a time sequence of images within the above-mentioned observation time window (cf. step 201). In some embodiments, step 401 may select the preliminary calibration data among the plurality of calibration data based on any suitable evaluation parameter.

Figure 4B:
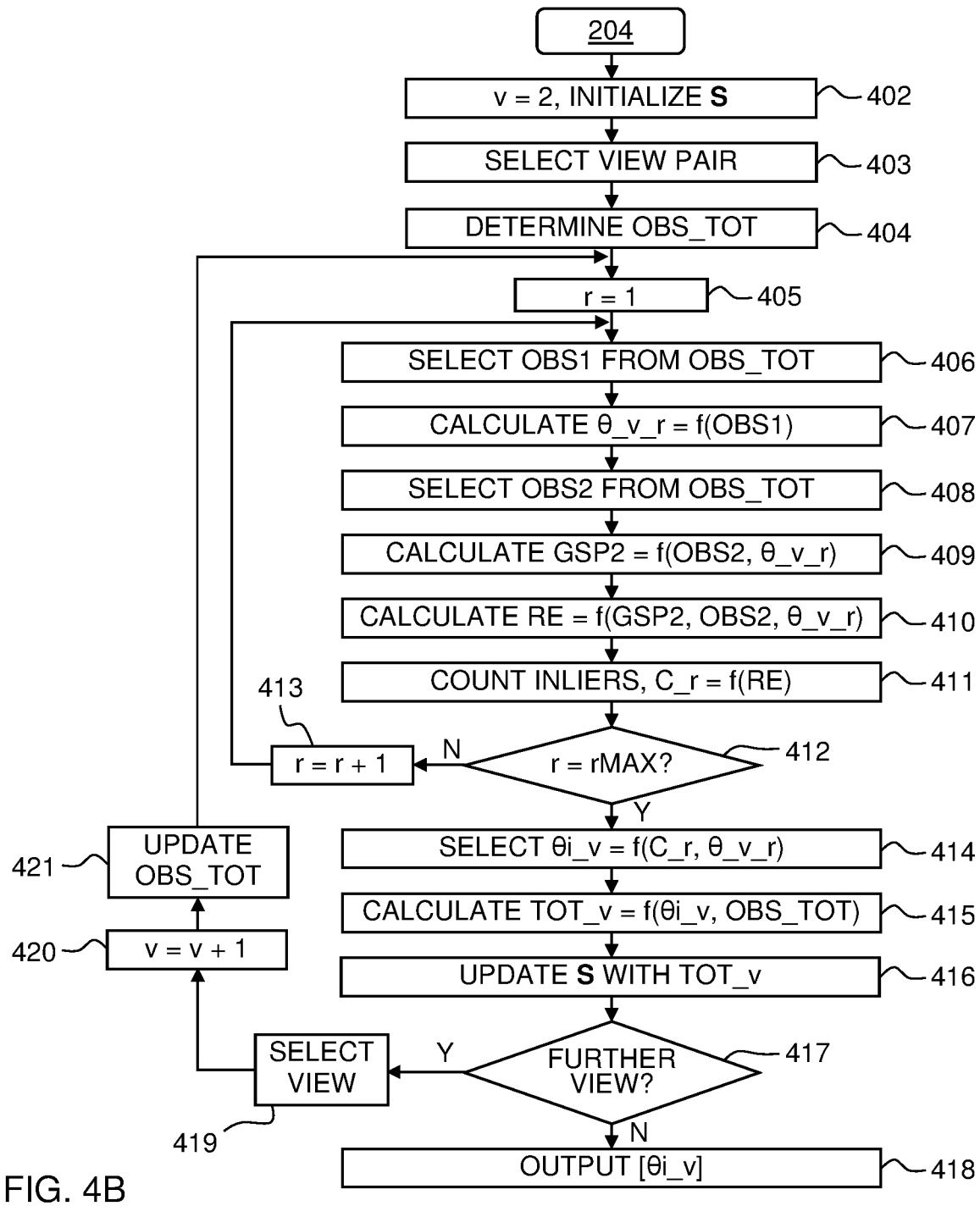

FIG. 4B is a flow chart of a detailed implementation example of the procedure in FIG. 4A. The implementation uses a sequence of RANSAC (random sample consensus) procedures to generate and gradually refine the selection among the candidate calibration data. In step 402, a view counter (v) is set to a starting value, for example 2, and a scene point vector S is initialized. In step 403, a pair of views is selected among the available views. The pair of views may be selected based on the number of keypoints that are associated between the views. In some embodiments, the pair of views may be selected to have a number of associated keypoints between a minimum and maximum limit. The minimum limit may be set to ensure a sufficient accuracy. The maximum limit may be set to ensure that the views reproduce the scene from sufficiently different angles, which has also been found to improve accuracy. In step 404, a collection of associated keypoints (OBS_TOT) for the pair of views is determined. The collection may include all associated keypoints for the pair of views. After step 404, the procedure enters a primary iteration over views and a secondary iteration over keypoint subsets. In step 405, a repetition counter (r) is set to a starting value, for example 1. Step 406 selects a first group of associated keypoints (OBS1) among OBS_TOT, and step 407 calculates candidate calibration data ($\theta\_v\_r$) as a function of OBS1. Step 407 may use any available algorithm for this purpose, for example an eight-point algorithm for the first pair of points (v=2) and the efficient P-n-P algorithm for v>2. Step 408 selects a second group of associated keypoints (OBS2) among OBS_TOT, and step 409 calculates a corresponding group of scene points (GSP2) as a function of OBS2 and $\theta\_v\_r$ calculated by step 407. The first and second keypoint groups OBS1, OBS2 differ by at least one keypoint and may be mutually exclusive. It may be noted that GSP2 need not be (and generally is not) a pose of an object in the scene, since its scene points correspond to OBS2, which is an arbitrary selection of associated keypoints from OBS_TOT. Step 410 determines a match score that represents the correspondence between OBS2 and GSP2. In some embodiments, the match score is based on the reprojection errors (RE) for the pair of views, with RE being calculated as a function of GSP2, OBS2 and $\theta\_v\_r$. Step 411 generates a count of the number of inliers (C_r) in GSP2 as a function of RE. In this context, an inlier may be defined as a scene point in GSP2 that yields an RE below a predefined distance threshold. Steps 406-411 are then repeated while incrementing the repetition counter (step 413) until the repetition counter reaches a predefined value (rMAX), as detected by step 412. The first and second groups are selected to differ across the repetitions. It is realized that the iteration of steps 406-413 serves to generate a plurality of candidate calibration data: [$\theta\_v\_1, \ldots, \theta\_v\_rMAX$] with v=2, and corresponding evaluation parameter values, [C_1, ..., C_rMAX]. The procedure then proceeds to step 414, which selects the preliminary calibration data ($\theta i\_v$ with v=2) for the pair of views, and thus for the corresponding pair of cameras, among [$\theta\_2\_1, \ldots, \theta\_2\_rMAX$], for example the candidate calibration data with the largest count of inliers. Step 415 calculates a total set of scene points (TOT_v with v=2) as a function of $\theta i\_2$ and OBS_TOT. Step 416 updates the scene point vector S, which is empty at this stage, by adding GSP_2 to S.

The procedure then proceeds to step 417, which evaluates if there are any remaining views. If so, the procedure continues to step 419, which selects one remaining view based on a selection criterion. In some embodiments, the selection criterion identifies the remaining view that has the largest number of, and/or most evenly distributed, scene points in common with the scene points in vector S. Step 420 then increments the view counter and updates OBS_TOT to contain associated keypoints that are present in all views in the current group of views, i.e. the pair of views selected by step 403 and the remaining view selected by step 419. The procedure returns to step 405 and iterates through steps 406-413. Step 414 then selects the preliminary calibration data ($\theta i\_v$ with v=3) for the camera corresponding to the selected remaining view. Step 415 calculates the total set of scene points (TOT_v with v=3) for the associated keypoints in OBS_TOT that appear in at least two views in the current group of views. Step 416 updates S with any new scene points in TOT_3 compared to TOT_2 (i.e. the "set difference" of TOT_3 and TOT 2). It is realized that the procedure continues until all available views have been processed, resulting in preliminary calibration data for all views ([$\theta i\_v$]), whereupon step 418 outputs ([$\theta i\_v$]), for example for use by step 206, and optionally step 205 (FIG. 2A). In some embodiments, step 205 may be omitted and the preliminary pose(s) may be given by the scene points in vector S, or a subset thereof.

Figure 5:
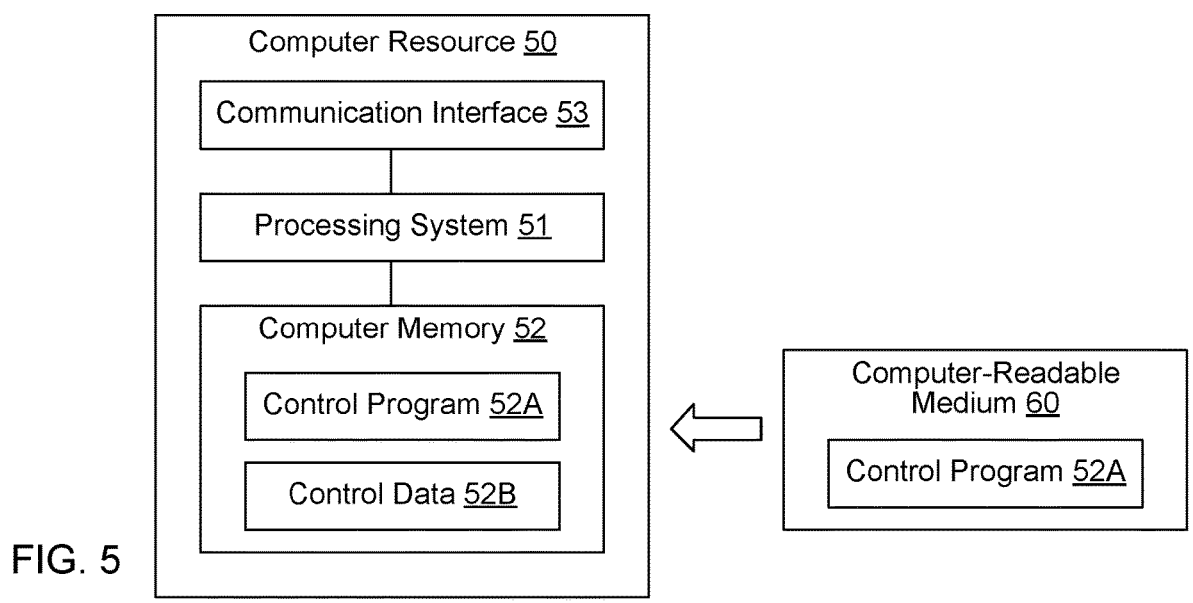
FIG. 5 is a block diagram of a machine that may implement any one of the methods in FIGS. 2-4.

The structures and methods disclosed herein may be implemented by hardware or a combination of software and hardware. In some embodiments, such hardware comprises one or more software-controlled computer resources. FIG. 5 schematically depicts such a computer resource 50, which comprises a processing system 51, computer memory 52, and a communication interface 53 for input and/or output of data. The communication interface 53 may be configured for wired and/or wireless communication, including communication with the detection device 3 and/or the cameras 2. The processing system 51 may e.g. include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 51A comprising computer instructions is stored in the memory 52 and executed by the processing system 51 to perform any of the methods, operations, procedures, functions, models or steps described in the foregoing. As indicated in FIG. 5, the memory 52 may also store control data 52B for use by the processing system 52, for example various predefined values such as thresholds, limits, etc. The control program 52A may be supplied to the computing resource 50 on a computer-readable medium 60, which may be a tangible (non-transitory) product (e.g. magnetic medium, optical disk, read-only memory, flash memory, etc.) or a propagating signal.

The techniques disclosed and exemplified herein have a variety of applications such as 3D vision inspection, product assembly, goods inspection, human-computer interaction, video surveillance, sports broadcasting, industry robot control, navigation, etc.

In the following, a set of items are recited to summarize some aspects and embodiments as disclosed in the foregoing.

Item 1. A method of calibrating cameras (2) that are arranged to generate at least partly overlapping views (V1-V3) of a scene (5), said method comprising: obtaining (301) preliminary calibration data of the cameras (2), said preliminary calibration data representing an arrangement of the cameras (2) in relation to a common coordinate system (30); obtaining (302) a preliminary pose for an object (10) in the scene (5), the preliminary pose comprising point locations in the common coordinate system (30) and being calculated based on feature points detected in the views (V1-V3); defining (303) an objective function comprising calibration data and pose as unknown variables, the objective function comprising a first function (303A) that determines an aggregation of differences between the feature points and the pose as projected onto the at least partly overlapping views (V1-V3) by use of the calibration data, and a second function (303B) that determines a quality of the pose as a function of relative orientation and relative distance between point locations included in the pose; optimizing (304) the objective function as a function of the calibration data and the pose, with starting values for the calibration data and the pose given by the preliminary calibration data and the preliminary pose; and providing (305) the calibration data that results in an optimization of the objective function.

Item 2. The method of item 1, wherein the point locations that are included in the pose corresponds to joints and/or extremities of a live body.

Item 3. The method of item 1 or 2, wherein the second function (303B) is configured to determine (321) the quality as a function of a difference between the pose and one or more valid object poses.

Item 4. The method of item 3, wherein the second function (303B) comprises a trained model which is configured to determine the quality in relation to an ensemble of valid object poses (344).

Item 5. The method of item 4, wherein the trained model comprises one or more of a neural network, an autoencoder, a PCA analysis function, a Gaussian Mixture Model function, or a Normalizing flows function.

Item 6. The method of any preceding item, wherein the second function (303B) comprises a trained discriminator (345) of a Generative Adverserial Network, GAN (340).

Item 7. The method of any preceding item, wherein the second function (303B) is configured to determine (322) the quality based on a comparison between a time sequence (350) of poses, which includes the pose, and a valid object motion.

Item 8. The method of item 7, wherein the second function (303B) is configured to operate (331) a prediction function (353) for valid object motion on at least a subset of the poses in the time sequence (350) to estimate a valid motion pose (352) for the pose, and determine (322) the quality as a function of a difference between the pose and the valid motion pose (352).

Item 9. The method of item 8, wherein the valid motion pose (352) is estimated to be concurrent with the pose in the time sequence (350) of poses.

Item 10. The method of any preceding item, further comprising: aligning the preliminary pose to a reference pose to generate adjusted point locations, and generating (310) the starting values for the pose based on the adjusted point locations.

Item 11. The method of item 10, wherein said generating (310) the starting values for the pose comprises: computing a standard deviation of the adjusted point locations, and dividing the adjusted point locations by the standard deviation.

Item 12. The method of any preceding item, wherein said generating (310) the starting values comprises: projecting the preliminary pose onto a kinematic chain space, KCS, to form a KCS matrix, and generating the starting values as a function of the KCS matrix.

Item 13. The method of any preceding item, wherein said optimizing (304) the objective function comprises: evaluating (311, 312), in a plurality of iterations, the objective function for current values of the pose and the calibration data in relation to an optimization criterion, wherein at least one of the iterations comprises: identifying (314) a set of feature points with a major influence on the objective function, and modifying (315) the set of feature points to reduce its influence on the objective function.

Item 14. The method of any preceding item, wherein said obtaining (302) the preliminary pose comprises: obtaining a plurality of preliminary poses for the object (10) in the scene (5), the preliminary poses being calculated based on feature points detected in the at least partly overlapping views (V1-V3) at different time points, wherein the objective function is defined (303) to comprise the calibration data and a plurality of poses as unknown variables, the first function (303A) determining the aggregation of differences between the feature points and the plurality of poses as projected onto the at least partly overlapping views (V1-V3) by use of the calibration data, and the second function (303B) determining the quality of the plurality of poses as a function of relative orientation and relative distance between point locations included in the respective pose, and wherein the objective function is optimized (304) as a function of the calibration data and the plurality of poses, with starting values for the calibration data and the plurality of poses being given by the preliminary calibration data and the plurality of preliminary poses.

Item 15. The method of any preceding item, wherein the first function (303A) is configured to compute the differences as a function of distances between the feature points and projected locations for the pose in the respective view, wherein the projected locations are projections of the point locations onto the respective view by use of the calibration data.

Item 16. The method of item 15, wherein the first function (303A) is configured to operate a Huber loss function on the distances to compute the differences.

Item 17. The method of item 15 or 16, wherein the first function (303A) is configured to apply weights to the differences to form weighted differences, and aggregate the weighted differences.

Item 18. The method of item 17, wherein the first function (303A) is configured to determine, for a respective camera, point distances between the respective camera and the point locations included in the pose, and calculate the weights as a function of the point distances.

Item 19. The method of item 18, wherein the weighted differences are calculated to favor larger point distances over shorter point distances.

Item 20. The method of any one of items 17-19, wherein the first function (303A) is configured to calculate the weights as a function of confidence scores assigned to the feature points, the confidence scores representing detection certainty of a respective feature point.

Item 21. The method of item 20, wherein the weighted differences are calculated to favor higher detection certainty over lower detection certainty.

Item 22. The method of any preceding item, wherein the objective function further comprises a smooth motion function that is configured to aggregate fourth-order differential values for trajectories of the point locations, wherein each of the trajectories comprises a subset of point locations that are associated over time.

Item 23. The method of any preceding item, wherein the objective function further comprises a length function that is configured to operate on the relative distance between the point locations as a function of time.

Item 24. The method of item 23, wherein the length function is configured to calculate coefficients of variation for the relative distance between pairs of location points as a function of time, and aggregate the coefficients of variation.

Item 25. The method of any preceding item, wherein said obtaining (301) preliminary calibration data comprises: calculating the preliminary calibration data as a function of the feature points detected in the at least partly overlapping views (V1-V3).

Item 26. The method of item 25, wherein the at least partly overlapping views (V1-V3) are repeatedly generated by the cameras (2) at a sequence of time points during an observation time window.

Item 27. The method of any preceding item, wherein said obtaining (301) preliminary calibration data comprises: calculating (400) a plurality of candidate calibration data for a plurality of different subsets of the feature points in the at least partly overlapping views (V1-V3), and determining (302) the preliminary calibration data as a function of the plurality of candidate calibration data.

Item 28. The method of item 27, wherein the preliminary calibration data is selected among the plurality of candidate calibration data.

Item 29. The method of any one of items 1-26, wherein said obtaining (301) preliminary calibration data comprises: selecting (403; 419) a group of views among the at least partly overlapping views (V1-V3); determining (404; 421) a collection (OBS_TOT) of corresponding feature points in the group of views; and performing (405-413) a number of repetitions of an estimation procedure for first and second groups (OBS1, OBS2) of corresponding feature points in the collection (OBS_TOT), wherein the first and second groups (OBS1, OBS2) differ within and between the repetitions, and wherein the estimation procedure comprises: determining (407) candidate calibration data ($\theta\_v\_r$) as a function of the first group (OBS1); calculating (409) a candidate group (GSP2) of point locations as a function of the second group (OBS2) and the candidate calibration data ($\theta\_v\_r$); and determining (410, 411) a match score representing a correspondence between the second group (OBS2) and the candidate group (GSP2); the method further comprising: determining (413) the preliminary calibration data ($\theta i\_v$) based on the match score and the candidate calibration data ($\theta\_v\_r$) determined by the repetitions of the estimation procedure.

Item 30. The method of item 29, wherein the match score is determined as a function of differences between the corresponding feature points in the second group (OBS2) and the point locations in the candidate group (GSP2) as projected onto the group of views by use of the candidate calibration data ($\theta\_v\_r$).

Item 31. A computer-readable medium comprising computer instructions (52A) which, when executed by a processing system (51), cause the processing system (51) to perform the method of any preceding item.

Item 32. A device configured to calibrate cameras (2) that are arranged to generate at least partly overlapping views (V1-V3) of a scene (5), said device comprising logic (51, 52) configured to control the device to: obtain preliminary calibration data of the cameras (2), said preliminary calibration data representing an arrangement of the cameras (2) in relation to a common coordinate system (30); obtain a preliminary pose for an object (10) in the scene (5), the preliminary pose comprising point locations in the common coordinate system (30) and being calculated based on feature points detected in at least partly overlapping views (V1-V3); define an objective function comprising calibration data and pose as unknown variables, the objective function comprising a first function (303A) representing an aggregation of differences between the feature points and the pose as projected onto the views by use of the calibration data, and a second function (303B) that determines a quality of the pose as a function of relative orientation and relative distance between point locations included in the pose; optimize the objective function as a function of the calibration data and the pose, with starting values for the calibration data and the pose given by the preliminary calibration data and the preliminary pose; and provide the calibration data that results in an optimization of the objective function.

Item 33. A system, comprising: at least two cameras (2) for distributed arrangement in relation to a scene (5) and configured to produce image data representing at least partly overlapping views (V1-V3) of the scene (5); a processing device (3) configured to receive and process the image data to detect feature points of an object (10) in the at least partly overlapping views (V1-V3); and the device in accordance with item 32.

Item 34: A method of calibrating cameras (2) that are arranged to generate at least partly overlapping views (V1-V3) of a scene (5), said method comprising: obtaining (301) preliminary calibration data of the cameras (2), said preliminary calibration data representing an arrangement of the cameras (2) in relation to a common coordinate system (30); obtaining (302) a preliminary pose for an object (10) in the scene (5), the preliminary pose comprising point locations in the common coordinate system (30) and being calculated based on feature points detected in the views (V1-V3); defining (303) an objective function comprising calibration data and pose as unknown variables; optimizing (304) the objective function as a function of the calibration data and the pose, with starting values for the calibration data and the pose given by the preliminary calibration data and the preliminary pose, respectively; and providing (305) the calibration data that results in an optimization of the objective function; wherein said obtaining (301) preliminary calibration data comprises: calculating (400) a plurality of candidate calibration data for a plurality of different subsets of the feature points in the views (V1-V3), and determining (401) the preliminary calibration data as a function of the plurality of candidate calibration data.

The invention claimed is:

1. A method of calibrating cameras that are arranged to generate at least partly overlapping views of a scene, said method comprising:
obtaining preliminary calibration data of the cameras, said preliminary calibration data representing an arrangement of the cameras in relation to a common coordinate system;
obtaining a preliminary pose for an object in the scene, the preliminary pose comprising point locations in the common coordinate system and being calculated based on feature points detected in the views;
defining an objective function comprising calibration data and pose as unknown variables, the objective function comprising a first function that determines an aggregation of differences between the feature points and the pose as projected onto the at least partly overlapping views by use of the calibration data, and a second function that determines a quality of the pose as a function of relative orientation and relative distance between point locations included in the pose;
optimizing the objective function as a function of the calibration data and the pose, with starting values for the calibration data and the pose given by the preliminary calibration data and the preliminary pose; and
providing the calibration data that results in an optimization of the objective function.

2. The method of claim 1, wherein the second function is configured to determine the quality as a function of a difference between the pose and one or more valid object poses.

3. The method of claim 2, wherein the second function comprises a trained model which is configured to determine the quality in relation to an ensemble of valid object poses.

4. The method of claim 1, wherein the second function comprises a trained discriminator of a Generative Adverserial Network, GAN.

5. The method of claim 1, wherein the second function is configured to determine includes the pose, and a valid object motion.

6. The method of claim 5, wherein the second function is configured to operate a prediction function for valid object motion on at least a subset of the poses in the time sequence to estimate a valid motion pose for the pose, and determine the quality as a function of a difference between the pose and the valid motion pose.

7. The method of claim 6, wherein the valid motion pose is estimated to be concurrent with the pose in the time sequence of poses.

8. The method of claim 1, wherein said generating the starting values comprises: projecting the preliminary pose onto a kinematic chain space, KCS, to form a KCS matrix, and generating the starting values as a function of the KCS matrix.

9. The method of claim 1, wherein said optimizing the objective function comprises: evaluating, in a plurality of iterations, the objective function for current values of the pose and the calibration data in relation to an optimization criterion, wherein at least one of the iterations comprises: identifying a set of feature points with a major influence on the objective function, and modifying the set of feature points to reduce its influence on the objective function.

10. The method of claim 1, wherein the first function is configured to compute the differences as a function of distances between the feature points and projected locations for the pose in the respective view, wherein the projected locations are projections of the point locations onto the respective view by use of the calibration data, and wherein the first function is configured to operate a Huber loss function on the distances to compute the differences.

11. The method of claim 1, wherein the first function is configured to compute the differences as a function of distances between the feature points and projected locations for the pose in the respective view, wherein the projected locations are projections of the point locations onto the respective view by use of the calibration data, and wherein the first function is configured to apply weights to the differences to form weighted differences, and aggregate the weighted differences.

12. The method of claim 11, wherein the first function is configured to determine, for a respective camera, point distances between the respective camera and the point locations included in the pose, and calculate the weights as a function of the point distances.

13. The method of claim 12, wherein the weighted differences are calculated to favor larger point distances over shorter point distances.

14. The method of claim 11, wherein the first function is configured to calculate the weights as a function of confidence scores assigned to the feature points, the confidence scores representing detection certainty of a respective feature point.

15. The method of claim 14, wherein the weighted differences are calculated to favor higher detection certainty over lower detection certainty.

16. The method of claim 1, wherein the objective function further comprises a smooth motion function that is configured to aggregate fourth-order differential values for trajectories of the point locations, wherein each of the trajectories comprises a subset of point locations that are associated over time.

17. The method of claim 1, wherein said obtaining preliminary calibration data comprises: calculating a plurality of candidate calibration data for a plurality of different subsets of the feature points in the at least partly overlapping views, and determining the preliminary calibration data as a function of the plurality of candidate calibration data.

18. The method of claim 1, wherein said obtaining preliminary calibration data comprises:
selecting a group of views among the at least partly overlapping views;
determining a collection of corresponding feature points in the group of views; and
performing a number of repetitions of an estimation procedure for first and second groups of corresponding feature points in the collection, wherein the first and second groups differ within and between the repetitions, and wherein the estimation procedure comprises:
determining candidate calibration data as a function of the first group;
calculating a candidate group of point locations as a function of the second group and the candidate calibration data; and
determining a match score representing a correspondence between the second group and the candidate group;
the method further comprising: determining the preliminary calibration data based on the match score and the candidate calibration data determined by the repetitions of the estimation procedure.

19. A non-transitory computer-readable medium comprising computer instructions which, when executed by a processing system, cause the processing system to perform the method of claim 1.

20. A device configured to calibrate cameras that are arranged to generate at least partly overlapping views of a scene, said device comprising logic configured to control the device to: obtain preliminary calibration data of the cameras, said preliminary calibration data representing an arrangement of the cameras in relation to a common coordinate system; obtain a preliminary pose for an object in the scene, the preliminary pose comprising point locations in the common coordinate system and being calculated based on feature points detected in at least partly overlapping views; define an objective function comprising calibration data and pose as unknown variables, the objective function comprising a first function representing an aggregation of differences between the feature points and the pose as projected onto the views by use of the calibration data, and a second function that determines a quality of the pose as a function of relative orientation and relative distance between point locations included in the pose; optimize the objective function as a function of the calibration data and the pose, with starting values for the calibration data and the pose given by the preliminary calibration data and the preliminary pose; and provide the calibration data that results in an optimization of the objective function.

\* \* \* \* \*